UNITED STATES PATENT OFFICE.

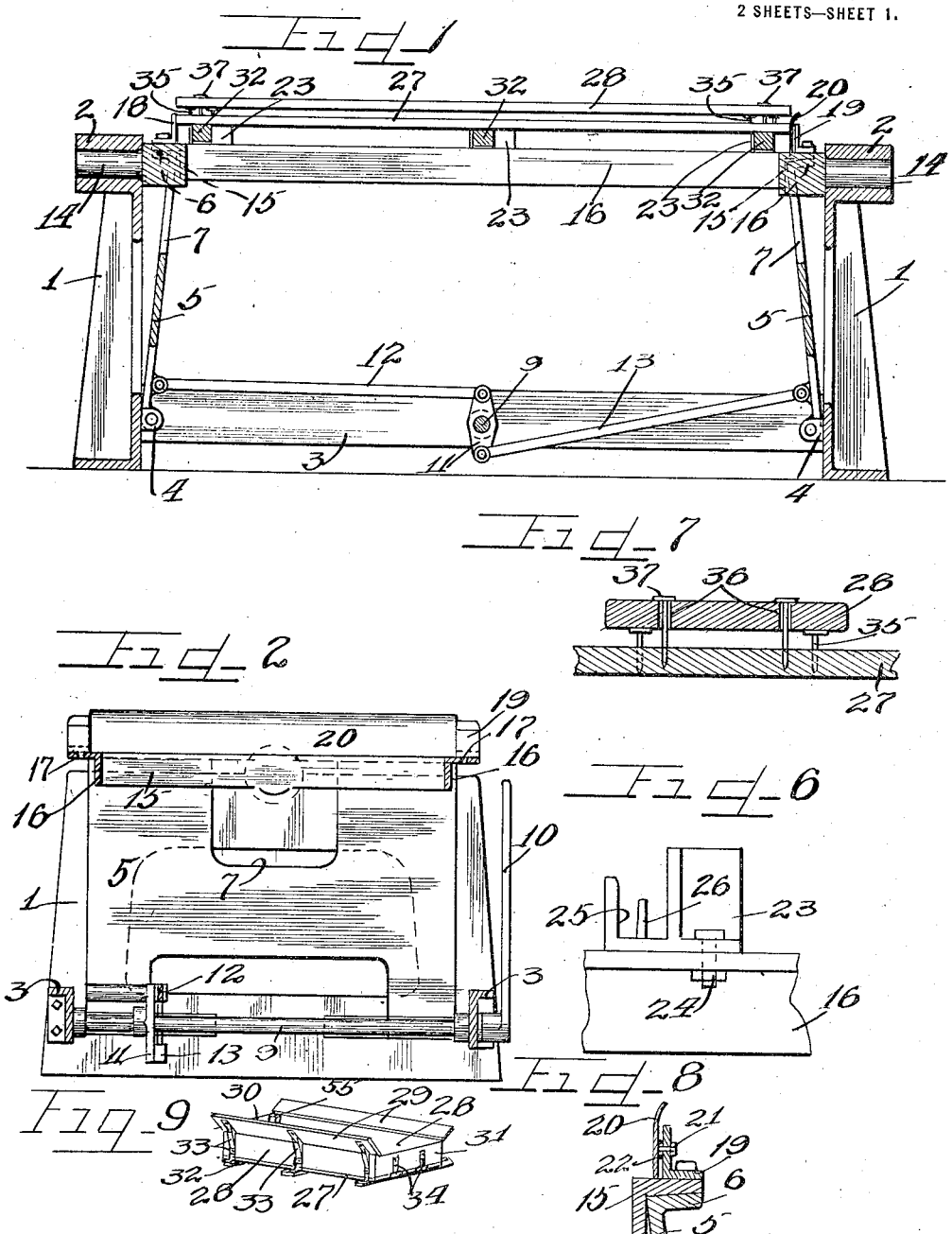

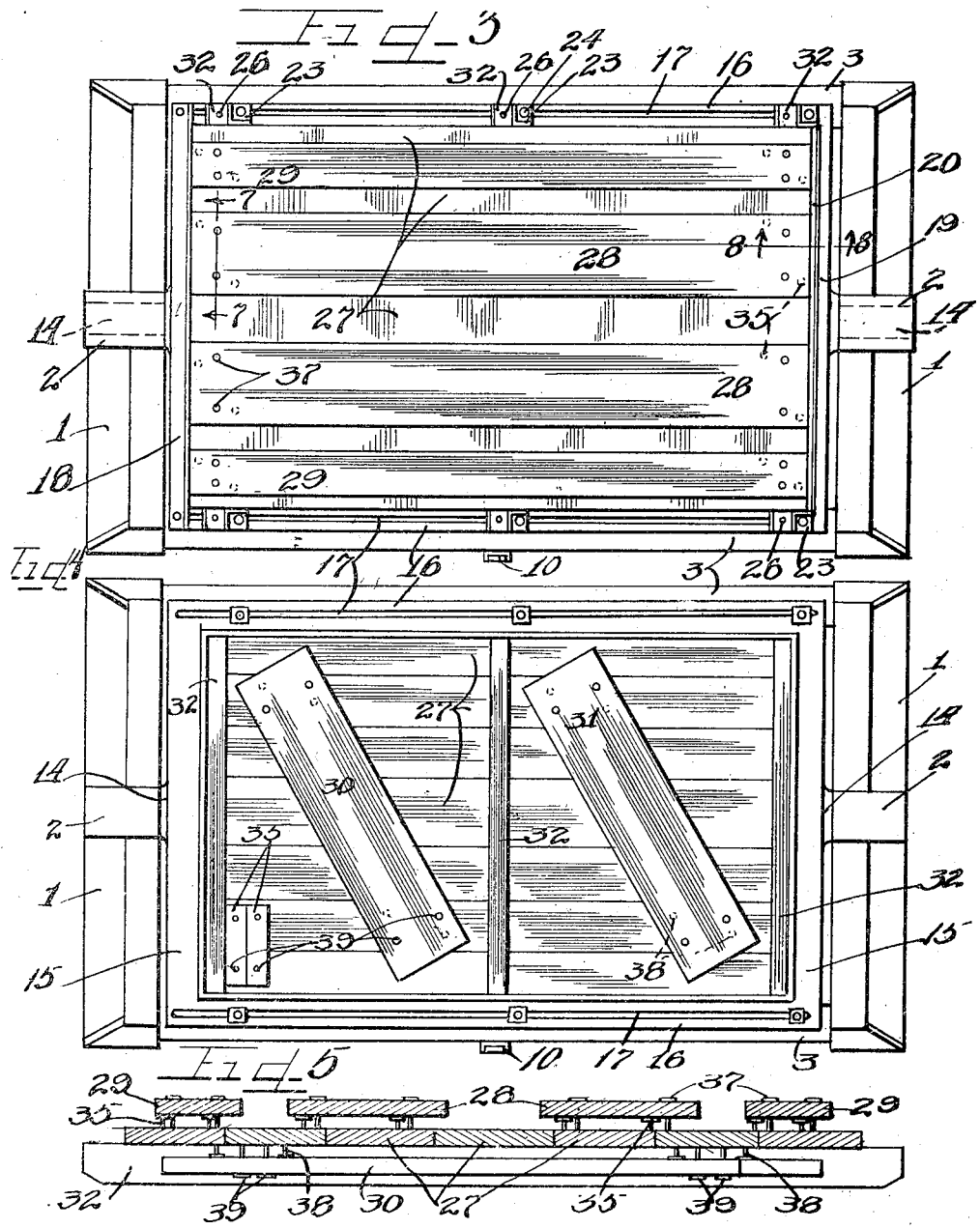

OLLIE C. GEORGE, OF CHICAGO, ILLINOIS.

METHOD OF ASSEMBLING TRUCK-BODIES IN KNOCKDOWN FORM.

1,335,574.  Specification of Letters Patent.  Patented Mar. 30, 1920.

Application filed June 14, 1919. Serial No. 304,150.

*To all whom it may concern:*

Be it known that I, OLLIE C. GEORGE, a citizen of the United States, and a resident of the city of Chicago, in the county of Cook and State of Illinois, have invented new and useful Improvements in Methods of Assembling Truck-Bodies in Knockdown Form; and I do hereby declare that the following is a full, clear, and exact description of the same, reference being had to the accompanying drawings, and to the numerals of reference marked thereon, which form a part of this specification.

It has been the practice in the manufacture of truck bodies to completely assemble the same in the factory and then ship the bodies in their completed form. This arrangement is expensive since the freight charges are high for the reason that the assembled bodies are hard to handle and take up a large amount of space in shipping.

This invention relates to a method of assembling truck bodies in knockdown form on a machine, with the truck body parts removably attached together in spaced relation to permit the truck body to be dipped in paint, dried and then crated with the metal parts, so that the truck body can be conveniently handled and will occupy less shipping space, thereby reducing the freight charges.

It is an object of this invention to provide a method for assembling truck bodies in knockdown form.

It is also an object of the invention to provide a rapid method permitting truck bodies to be readily assembled in knockdown form to facilitate painting and shipping of said bodies.

A further object of this invention is the method of assembling a vehicle body by removably securing the wooden parts together by means of nails which are arranged to hold the wooden parts spaced apart so that when the assembled knockdown body is dipped in a bath of paint all the exposed surfaces of the truck body will be painted.

It is an important object of this invention to provide a method whereby a truck body may be rapidly assembled in knockdown form, painted, crated and shipped at a comparatively small cost.

Other and further important objects of this invention will be apparent from the disclosures in the specification and drawings.

The invention (in a preferred form) is illustrated in the drawings and hereinafter more fully described.

On the drawings:

Figure 1 is a longitudinal central vertical section taken through a machine facilitating the method of assembling knockdown truck bodies.

Fig. 2 is a transverse central vertical section of the machine on which the truck bodies are assembled showing parts in elevation.

Fig. 3 is a top plan view of the machine showing a truck body in assembled knockdown form.

Fig. 4 is a similar view but showing the assembled knockdown form rotated with the bottom uppermost.

Fig. 5 is a transverse section of an assembled knockdown truck body showing the parts secured together in separated relation.

Fig. 6 is an enlarged elevation of one of the adjustable holders for the truck body cross rails.

Fig. 7 is an enlarged fragmentary detail section taken on line 7—7, of Fig. 3.

Fig. 8 is a fragmentary detail section taken on line 8—8, of Fig. 3.

Fig. 9 is a small perspective view of an assembled truck body ready to be attached to a vehicle chassis.

As shown on the drawings:

The reference numeral 1, indicates a pair of end supporting frames or standards, each having integrally formed in the middle portion of the top thereof a bearing sleeve 2. The standards 1, are rigidly secured together at their sides and near the bottom by sills or side brace bars 3. Rigidly secured or integrally formed on the lower portion of the inner surface of each of the standards 1, are a pair of apertured brackets 4, for pivotally supporting the lower end of a locking plate 5, which has an outwardly directed flange 6, integrally formed on the upper edge thereof. An opening 7, is provided in the upper central part of the locking plate and its flange 6. Journaled in bearing sleeves 8, formed on the side braces 3, is a transverse shaft 9, one end of which projects through one of said side braces 3, and has a lever or handle 10, secured thereon for the purpose of rotating or rocking said shaft. Keyed or otherwise secured on the shaft 10, is a centrally mounted link 11, to one end of which is pivotally connected one end of a connecting rod 12. The other end of the rod 12, is pivotally attached to the inner surface of one of the locking plates 5. Pivotally connected to the inner surface of the other locking plate 5, is one end of a connecting rod 13, the other end of which is pivotally connected to the second end of the link 11, as clearly shown in Fig. 1.

Rotatably mounted in the bearing sleeves 2, are the trunnions or stub axle pins 14, which are integrally formed centrally on the end members 15, of a rotatable angle-iron frame, the side sills of which are denoted by the reference numeral 16, and are provided with longitudinal slots 17. Securely mounted on the upper surface of one of the frame end members 15, is an angle abutment bar 18. An angle bar 19, is rigidly mounted on the other end frame member 15, and has adjustably disposed to the inside thereof an adjustable curved retaining plate 20. Pins or bolts 21, are secured to the plate 20, and slidably project through apertures provided in the vertical flange of the angle bar 19. Springs 22, are engaged on the bolts 21, between the angle bar 19 and the adjustable plate 20, to normally hold the plate 20, projected away from the angle bar. A plurality of sockets or holders 23, are adjustably secured in place on each of the frame sills 16, by means of bolts 24, which project through the slots 17, in which the bolts are adapted to slide when the bolts are loosened. Each of the holders 23, is provided with a pocket 25, from the floor of which a pin or peg 26, projects, as disclosed in Fig. 6.

The truck body is disclosed in assembled form in Fig. 9, and embraces a bottom made of bottom boards 27, two side boards 28, flare boards 29, a front board 30, a tail board or end gate 31, and cross rails 32. The side boards and the flare boards are secured together and attached to the ends of the cross rails by metal braces 33. Strap hinges 34, are used to pivotally connect the end gate 31, to the floor. The front board 30, is secured to the floor and to the front ends of the side boards, and said front board is braced by brace strips or blocks 55, which are secured in the front corners of the truck body.

The method and operation are as follows:

The various wooden and metal parts comprising the truck body are all of standard form and size, and are carried in stock in any quantity desired. The assembling machine is preferably located in the stock room to permit an operator to have convenient access to the standard stock parts.

The method of assembling the truck body parts in knockdown form for shipping is adapted to be rapidly accomplished as follows: The rotatable machine frame 15—16, is positioned horizontally and locked in place by operating the lever 10. Operation of the lever 10, causes rotation of the shaft 9 and the link 11, thereby causing a pull to be exerted by the rods 12 and 13, on the plates 5, which are swung inwardly to permit the flanges 6, thereof to lockingly engage under the horizontal taper flanges of the frame end members 15, as clearly shown in Figs. 1 and 8. The frame 15—16, is thus locked against rotation.

Three cross rails 32, are taken from stock and are disposed transversely of the frame 15—16, with the apertured ends of said rails seated in the pockets 25, of the holders 23, so that the pins 26, engage in the apertures in the rails. The holders 23, are arranged in pairs and are rigidly secured in their adjusted positions by the bolts 24. With the cross rails properly positioned as described, a plurality of bottom boards 27, are placed thereon side by side and longitudinally of the frame until the proper width is reached. The width of the truck body is determined by the holders 23, against which the outer edges of the two outermost floor boards abut. The floor boards 27, are positioned by placing the front edges thereof against the abutment angle bar 18, and pressing the rear ends of the boards 27, down against the spring controlled retaining plate 20, which is accordingly forced outwardly against the angle bar 19. The springs 22, act to force the plate 20, inwardly again against the boards 27, to hold the same in place. The boards 27, are next rigidly nailed or bolted permanently to the cross rails 32.

As shown in Figs. 5 and 7, a plurality of flat headed nails 35, are now driven into the upper surface of the boards 27, until the nail heads are all in the same plane and positioned a short distance above the upper surfaces of the boards 27. The nails 35, serve as supports for the truck body side boards 28, and the flare boards 29, which are arranged parallel to one another and spaced from the bottom boards 27. The side boards and the flare boards are provided with apertures or holes 36, to permit the same to be readily secured in place when the truck body is assembled for use. Flat headed nails 37, are next engaged through the holes 36, of the side boards and the flare boards, and said nails 37, are driven into the bottom boards 27, thus removably clamping the side boards and the flare boards in place between the flat heads of the nails 35 and 37.

The lever 10, is now thrown to cause the locking plates 5, to swing outwardly against the inner surfaces of the standards 1, thereby releasing the frame 15—16, which is manually rotated to turn the bottom of said frame up. The lever is then moved to again move the locking plates 5, into locking position to hold the frame 15—16, locked against rotation. Flat head nails 38, are driven part way into the bottom surfaces of the bottom boards 27, and said nails 38, serve as supports for the front board 30, and the end gate 31, which are placed thereon as shown in Fig. 4. Flat headed nails 39, are engaged through nail holes in the board 30 and the gate 31, and said nails 39, are driven into the bottom boards 27, to removably clamp the front board 30, and the end gate 31, in place spaced from the bottom boards. The front corner blocks 55 are similarly removably secured in place spaced from the bottom boards.

The frame 15—16, is again reversed and the truck body in its compact assembled knockdown form is removed from the machine, dipped in a bath of paint and allowed to dry. All the surfaces of the various parts comprising the truck body are thus painted, and the body in its painted knockdown form is then crated, and the metal hinges, braces and bolts are placed in a separate box which is nailed or otherwise secured to the shipping crate.

It will be understood that the method of assembling described may be used with various forms of knockdown structures, such as boxes, crates, and articles of furniture. If desired, the machine, for holding the parts associated during the assembling thereof, may also be of a form different than that shown.

I am aware that numerous details of construction may be varied through a wide range without departing from the principles of this invention, and I therefore do not purpose limiting the patent granted otherwise than necessitated by the prior art.

I claim as my invention.

1. A method for preparing knockdown articles for finishing and for storage or shipping which comprises the combination with such a spacing of parts as to permit liquids or fluids to traverse every surface of each part, as for coating or drying, with such a relative arrangement thereof, otherwise in flat compact relation in small compass and securing them so as to facilitate handling or storage.

2. The method covered by claim 1, qualified by the selection of spacing and securing means which enter or pass through the parts or engage opposing surfaces thereof only without encompassing or inclosing the parts, thus facilitating the exposure of every surface to such fluids or liquids.

In testimony whereof I have hereunto subscribed my name in the presence of two subscribing witnesses.

OLLIE C. GEORGE.

Witnesses:
EARL M. HARDINE,
CHARLES W. HILL, Jr.